(12) United States Patent
Eppler et al.

(10) Patent No.: US 10,311,897 B1
(45) Date of Patent: Jun. 4, 2019

(54) MULTITRACK DATA STORED USING PERPENDICULAR AND LONGITUDINAL MAGNETIC FIELDS

(71) Applicant: Seagate Technology LLC, Cupertino, CA (US)

(72) Inventors: Walter R. Eppler, Cranberry Township, PA (US); Mehmet Fatih Erden, St. Louis Park, MN (US); Stephanie Hernandez, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/048,768

(22) Filed: Jul. 30, 2018

(51) Int. Cl.
*G11B 5/00* (2006.01)
*G11B 5/09* (2006.01)
*G11B 20/18* (2006.01)
*G11B 5/48* (2006.01)

(52) U.S. Cl.
CPC .............. *G11B 5/09* (2013.01); *G11B 5/4826* (2013.01); *G11B 20/1833* (2013.01)

(58) Field of Classification Search
CPC .. G11B 5/09; G11B 20/10; G11B 5/00; G11B 15/52; G11B 5/59633
USPC .......................... 360/39, 55, 66, 73.12, 77.06
See application file for complete search history.

(56) References Cited

U.S. PATENT DOCUMENTS

| | | | |
|---|---|---|---|
| 4,803,571 A | 2/1989 | Fujioka et al. | |
| 5,956,216 A | 9/1999 | Chou | |
| 9,431,039 B1 * | 8/2016 | Li | G11B 5/3912 |
| 9,818,445 B2 | 11/2017 | Zhu et al. | |
| 9,824,703 B2 | 11/2017 | Sugawara et al. | |

* cited by examiner

*Primary Examiner* — Nabil Z Hindi
(74) *Attorney, Agent, or Firm* — Hollingsworth Davis, LLC

(57) ABSTRACT

First and second tracks of a magnetic recording medium are read simultaneously via a first reader that provides a first signal based on detecting a total perpendicular field of the first and second tracks. The first and second tracks are read simultaneously via a second reader that provides a second signal based on detecting a total longitudinal field of the first and second tracks. Data is detected from the first and second signals.

20 Claims, 10 Drawing Sheets

MULTITRACK DATA STORED USING PERPENDICULAR AND LONGITUDINAL MAGNETIC FIELDS

SUMMARY

Various embodiments described herein are generally directed to a multitrack data that is stored using perpendicular and longitudinal magnetic fields. In one embodiment, first and second tracks of a magnetic recording medium are read simultaneously via a first reader that provides a first signal based on detecting a total perpendicular field of the first and second tracks. The first and second tracks are read simultaneously via a second reader that provides a second signal based on detecting a total longitudinal field of the first and second tracks. Data is detected from the first and second signals.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., disks. Recording schemes have been developed to increase areal density for conventional magnetic recording (CMR) devices, e.g., perpendicular magnetic recording (PMR) as well as devices using newer technologies, such as heat-assisted magnetic recording (HAMR), microwave-assisted magnetic recording (MAMR) and bit-patterned media (BPM). Other recording schemes such as shingled magnetic recording (SMR) and interlaced magnetic recording (IMR) can also increase areal density by partially overlapping tracks to decrease effective track width. Both SMR and IMR can be used with CMR and advanced writing technologies such HAMR, MAMR, and BPM.

These advanced recording schemes may operate on the assumption of a one-dimensional (1-D) system design and drive architecture. On the other hand, magnetic recording media surface, in principle, provides a two-dimensional (2-D) environment. It is the system design and the resulting drive architecture which constrains inherently a 2-D system to 1-D system, mainly because of historical cost and complexity arguments. Thus, in parallel with HAMR and BPM development, the constraints limiting the overall design to 1-D are being further explored to see if the current recording technology can support higher AD and/or better drive performance if some of those constraints are modified by making the system utilize the 2-D nature of the media surface, which is called two-dimensional magnetic recording (TDMR).

In a TDMR device, multiple readers are used, and they sense magnetic fields in one direction, for example, perpendicular to the media surface for PMR. However, based on what is written on the surface of the media and the location of the reader, magnetic fields emerge in other directions which cannot be detected by the current readers employed in today's drives. An example of this is shown in FIG. 1, which illustrates a recording device 100 according to an example embodiment.

Figure 1:
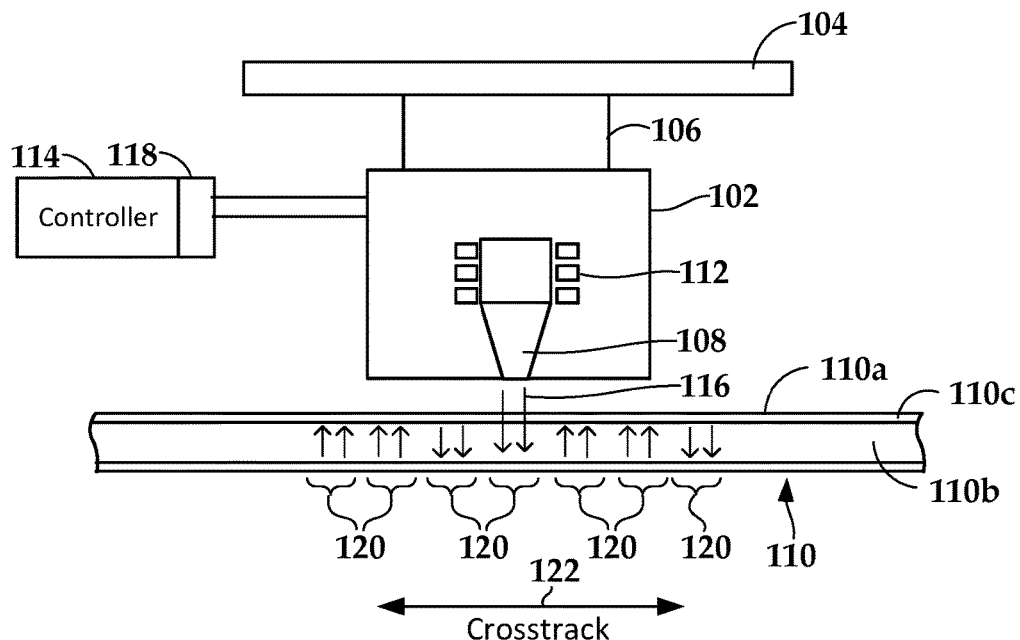
FIG. 1 is a diagram illustrating a magnetic recording device according to an example embodiment.

In FIG. 1, a block diagram shows a front view of a write head 102 (also referred to as a "read head," "read/write head," "recording head," etc.) according to an example embodiment. The write head 102 is part of slider that is coupled to an arm 104 by way of a suspension 106, e.g., a gimbal. The write head 102 includes a write pole 108 that is held proximate to a surface 110a of a magnetic recording medium 110, e.g., a magnetic disk. A coil 112 is electrically activated via a controller 114 that applies a current to the coil 112. The activated coil 112 causes the write pole 108 to apply a magnetic field 116 to the recording medium 110.

The controller 114 is coupled to other components of the write head 102, such as read transducers, heaters, sensors, etc. The controller 114 may be part of general- or special-purpose logic circuitry that controls the functions of a storage device (e.g., disk drive) that includes at least the write head 102 and recording medium 110. The controller 114 may include or be coupled to interface circuitry 118 that include circuits such as preamplifiers, buffers, filters, digital-to-analog converters, analog-to-digital converters, decoders, encoders, write channels, etc., that facilitate electrically coupling the logic of the controller 114 to the signals used by the write head 102 and other components.

The illustrated write head 102 and recording medium 111 are configured for perpendicular magnetic recording (PMR). This may involve using a return pole (not shown) located downtrack from the write pole 108 that provides a return path for the magnetic flux. Note that the downtrack direction is in and out of the plane of the drawing page, substantially normal to the crosstrack direction. The recording medium 110 includes a magnetically-soft underlayer 110b that sits below a higher-coercivity recording layer 110c. The soft underlayer 110b acts as a horizontal flux path between the write pole 108 and return pole, allowing a strong, perpendicular magnetic field to be used to write bits to the recording layer.

When writing, the write head 102 is positioned over tracks 120 via the arm 104. As indicated by the arrows, adjacent tracks 102 may have the same or different magnetic orientations, as indicated by the up and down arrows. In conventional systems, a read transducer (not shown) such as a magnetoresistive sensor is placed over a track 120 and changes in direction of the perpendicular field over the track 120 induces an electric signal. This electrical signal is decoded by the controller 114 to read the stored data.

Figure 2:
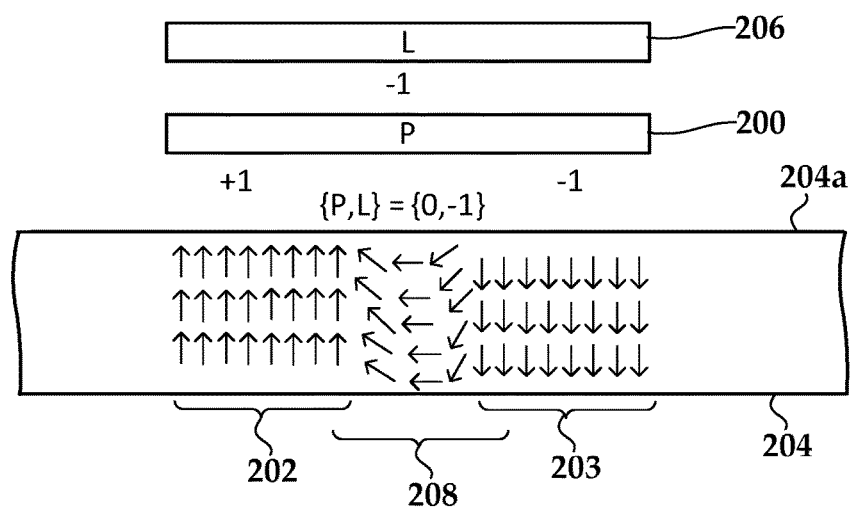
FIG. 2 is a diagram illustrating first and second readers spanning a track according to an example embodiment.

In some schemes, e.g., TDMR multi-track (TDMR-MT), a read sensor may span more than one track 120, such that a combination of magnetic fields induces a signal into the read transducer. An example of this is shown in the block diagram of FIG. 2. A first read transducer 200 is held over two tracks 202, 203 of a recording medium 204. As indicated by the letter "P," the read transducer 200 is configured to read perpendicular fields, which are vertical in this view. The perpendicular magnetic field orientations of the tracks 202, 203 are arbitrarily assigned a +1 if pointing upwards and −1 if pointing downwards. Thus, the read transducer 200 would read a combination of these fields, which is at or near zero (P=0) at this location.

Note that in region 208 the magnetic field is transitioning between the opposite perpendicular orientations of tracks 202 and 203. Thus in region 208, there is a horizontal (or longitudinal) field that is arbitrarily assigned a negative value in the figure if pointing to the left. A second reader 206 is configured to read the longitudinal field in region 208, which in this case is L=−2. Note that the first and second readers 200, 206 are shown schematically over the recording medium 204, and in a device would likely be located downtrack from one another and have the same or similar separation from the top surface 204a of the recording medium 204.

Figure 3:
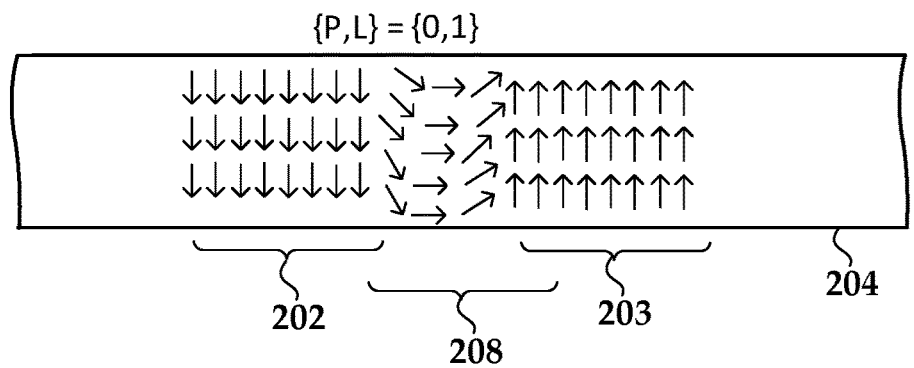
FIGS. 3-5 are diagrams illustrating adjacent track magnetic fields according to example embodiments.
Figure 4:
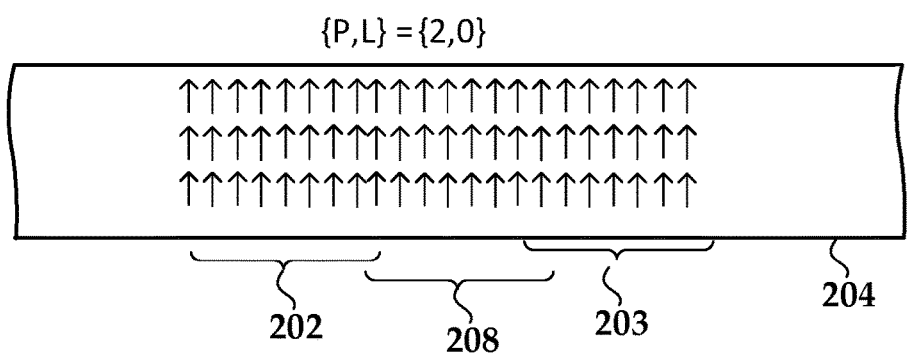
Figure 5:
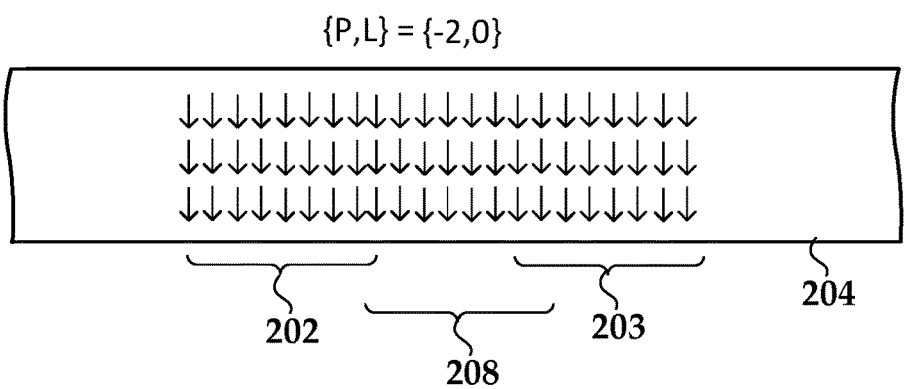

By using first and second readers 200, 206 that cover two or more tracks 202, 203, two signals can be extracted. A first signal from the first reader 200 detects the total perpendicular field over the two or more tracks 202, 203. A second signal from the second reader 206 detects the total longitudinal field over the two or more tracks 202, 203. The first and second signals can be used to provide two different data streams from the two tracks 202, 203. The use of wide readers 200, 206 over multiple tracks increases the signal-to-noise ratio (SNR) of the signals, yet still allows for an areal density similar to an arrangement that reads the two tracks separately with a single-track-width reader. In FIGS. 3-5, a diagram of the recording medium 204 shows other combinations of adjacent track fields, which result in the values {P,L} being detected by readers 200, 206 as {0, 2}, {2, 0} and {−2,0}, respectively.

Figure 6:
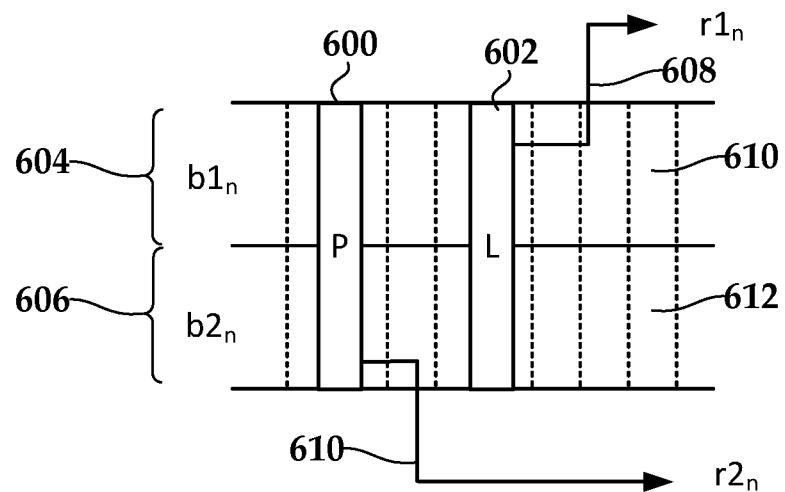
FIG. 6 is a block diagram illustrating a vector recording scheme according to an example embodiment.

The concepts shown in FIGS. 2-5 can be used as a recording scheme referred to herein as vector recording or quadrature recording. Vector recording generally used multiple readers, overall sensing two or more orthogonal magnetic field directions of the recording media. In FIG. 6, a diagram illustrates a vector recording scheme according to an example embodiment. A first reader 600 (P) (also referred to herein as a read transducer) senses total, multitrack magnetic fields perpendicular to the media surface 604. A second reader 602 (L) senses total, multitrack magnetic fields in a plane parallel to the media surface 604, also referred to as in-plane or longitudinal fields. In response to detecting these fields, the first and second readers 600, 602 provide first and second signals $r1_n$, $r2_n$.

In FIG. 6 and other subsequent figures, the bit boundaries of the tracks are indicated by dashed lines in a cross-track direction. In many of the embodiments described herein, the bits between two adjacent tracks are aligned so that the readers 600, 602 read bits from both tracks at the same time. These bits are referred to herein as aligned or corresponding bits. An example pair of aligned/corresponding bits 610, 612 is shown in tracks 604, 606, respectively. These bits jointly encode data that is read by the individual readers 600, 602 based on the combined magnetic field of the bits 610, 612. Note that the readers 600, 602 are offset in the downtrack direction, and so combining the signals $r1_n$, $r2_n$ from the first and second readers 600, 602 may involve buffering at least one signal as well as detecting and applying a time offset between the signals that corresponds to the downtrack separation of the readers 600, 602 at a particular location where the tracks 604, 606 are moving under the readers.

Figure 7:
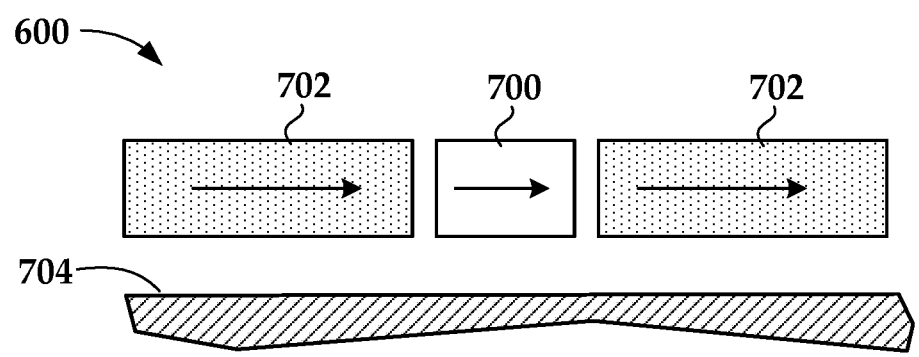
FIG. 7 is a diagram of a first reader according to an example embodiment.
Figure 8:
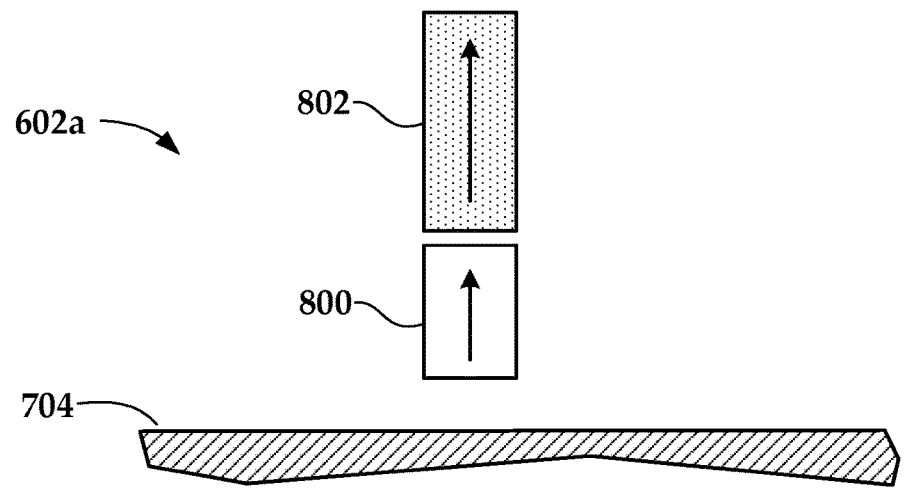
FIGS. 8-10 are diagrams of second readers according to example embodiments.
Figure 9:
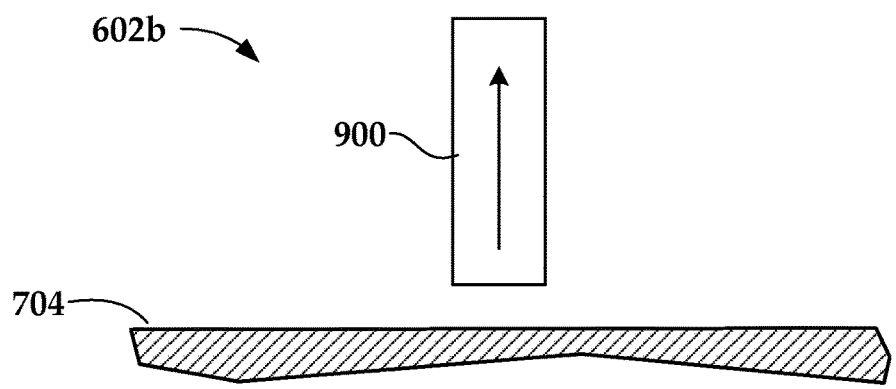
Figure 10:
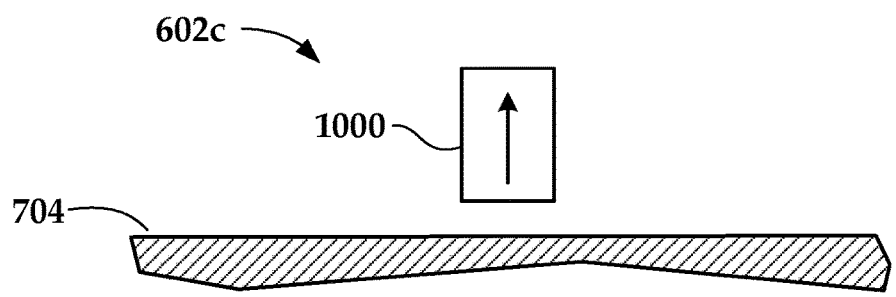

In FIG. 7, a diagram shows details of the first reader 600 according to an example embodiment. The first reader 600 has a free layer 700 biased between two side shields 702. The free layer 700 is sensitive to any changes in magnetic field perpendicular to the media surface 704. In FIGS. 8-10, diagrams show three different designs 602a-c for the second reader 602 according to example embodiments. These readers 602a-c sense changes in magnetic field in-plane relative to the media surface because of their free layer field orientations. Reader 602a includes a free layer 800 stabilized by a permanent magnet 802. Reader 602b has a free layer 900 that is stabilized by shape anisotropy. Reader 602c has a free layer 1000 that stabilized by some other mechanism, for example, through pinning field or magnetocrystalline anisotropy.

Figure 11:
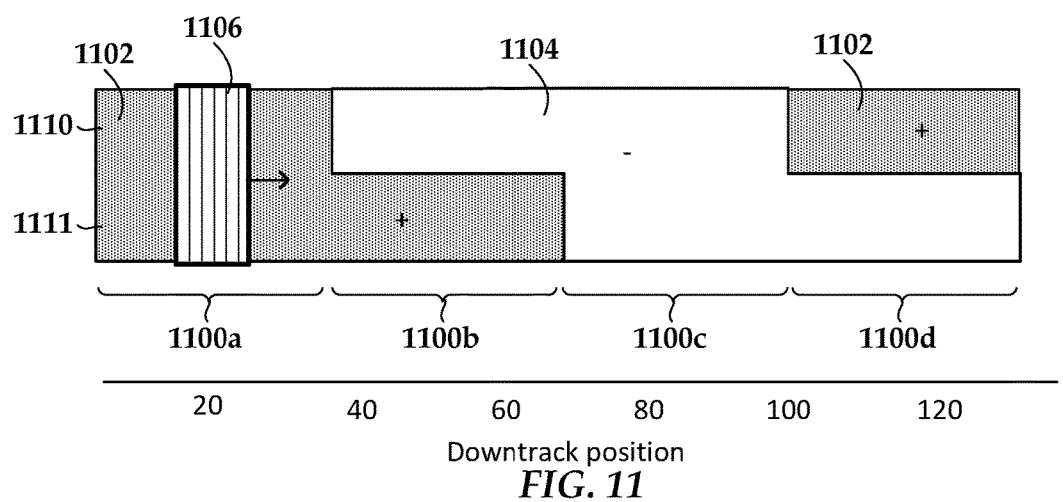
FIG. 11 is a diagram showing a model used to demonstrate performance of vector recording according to an example embodiment.
Figure 12:
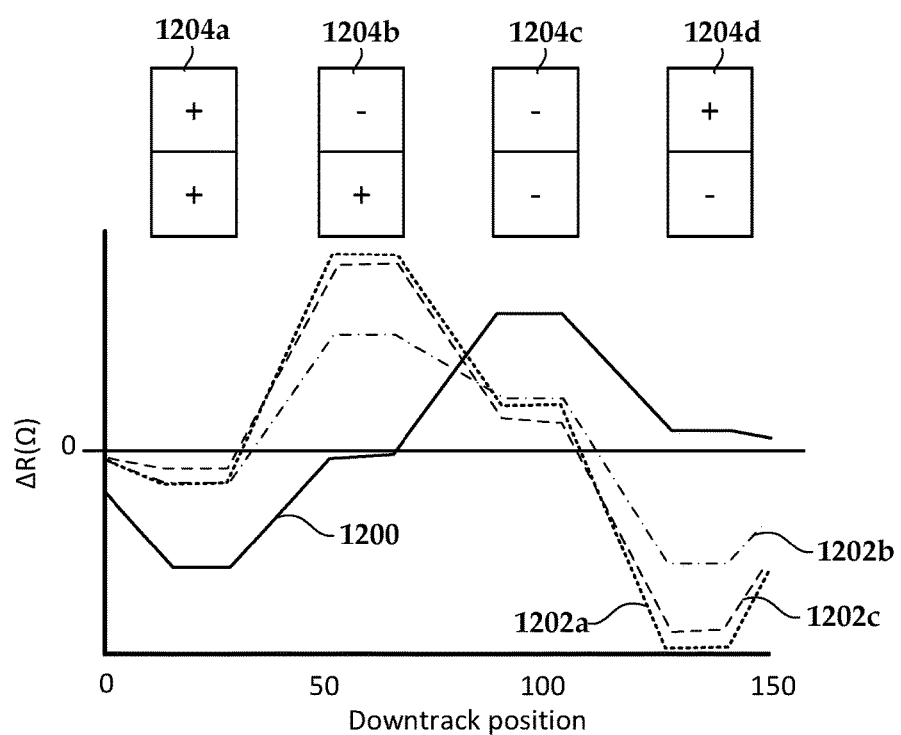
FIG. 12 is a graph showing performance of vector recording according to example embodiments.

In FIG. 11, a diagram shows a model used to demonstrate performance of vector recording under various conditions. Tracks 1110, 1111 (which may also be considered subtracks within a single track) include shaded regions 1102 with a positive magnetic field and unshaded region 1104 with a negative field. A read transducer 1106 spans the tracks 1110, 1111 and may be configured as any of the readers shown in FIGS. 7-10. The tracks 1110, 1111 are divided into four regions 1100a-d along the downtrack position. In FIG. 12, a graph shows results of modeling the arrangement shown in FIG. 11. Curve 1200 represents the response (in this case, a change of reader resistance) of the perpendicular reader 600 shown in FIG. 7. Curves 1202a-c represent the responses of the readers 602a-c shown in FIGS. 8-10. Blocks 1204a-d represent the different field combinations of the tracks 1110, 1111 in regions 1100a-d in FIG. 11.

In the results shown in FIG. 12, perfect media magnetization was assumed. It was also assumed that the adjacent tracks s 1110, 1111 were written synchronously, such that bit boundaries are aligned between tracks/subtracks. As seen in by curve 1200, the perpendicular reader 600 can sense non-zero signals when two adjacent track bits are the same, while the reader amplitude will be nearly zero if those bits are different. In other words, the perpendicular reader 600 can be used when the two adjacent tracks are the same, but that reader 600 cannot resolve which bit is + or − if they have different signs.

On the other hand, the longitudinal reader 602 can be used when bits written at adjacent tracks have different signs. The reader 602b (represented by curve 1202b) has less amplitude than readers 602a and 602c. The reader 602a can be stabilized by permanent magnet, and yields similar signal strength to that of perpendicular reader 600. Thus, these modeling results show the existence of reader design which can yield signal strength similar to that of the perpendicular reader 600 when bits at adjacent tracks are different.

Figure 13:
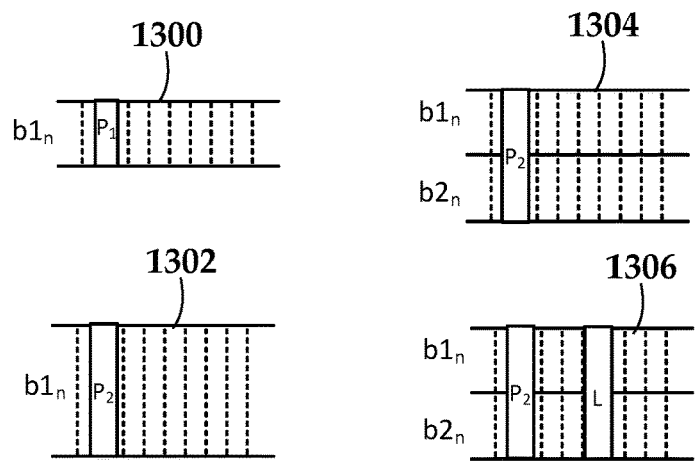
FIG. 13 is a diagram comparing performance of vector recording according to example embodiments to other configurations.

In FIG. 13, a diagram compares performance of a vector recording arrangement according to an example embodiment with other recording configurations. Configuration 1300 has a single track written at a TPI (tracks per inch) which can recover bits written at a BPI (bits per inch) at a system SNR. Arrangement 1302 uses the same BPI written at a track twice as wide. This yields a 3 dB system SNR improvement however operates at half of the track density of arrangement 1300 (TPI/2). Arrangement 1304 uses write synchronization functionality to write two adjacent tracks having bits synchronized between the tracks. The arrangement 1304 operates at the original TPI of arrangement 1300 and the reader ($P_2$) also yields 3 dB higher SNR for b1=b2 at a given time. However, the single reader ($P_2$) cannot resolve which bit has what sign when b1=−b2.

Arrangement 1306 applies the proposed architecture by including the second reader (L) sensing the in-plane field changes. The reader (L) can detect the bits when they have different signs at the SNR similar to the reader ($P_2$) sensing the bits with the same signs. Thus, compared to the reference configuration 1300, the architecture 1306 yields SNR gains which can be used to improve the areal density capability (ADC) of the drive by increasing TPI and/or BPI. In addition to the SNR gains, which can be leveraged to increase drive capacity, two tracks of data can be contemporaneously detected. This can improve the drive performance by increasing read throughput by a factor of about two.

The longitudinal read sensor (L) is capable of sensing the field in the plane of the disk oriented across the track, which exists when there is a difference in the vertical field from the two adjacent tracks. Together the sensors (L) and ($P_2$) can recover approximately independent ternary pulse-amplitude-like modulated signals over roughly the same area as the standard partial response binary pulse amplitude modulated perpendicular recording signal. In addition to the potential areal density increase, signaling with the two ternary pulse amplitude modulated signals (quadrature or vector recording) will nearly double the readback data rate. A more detailed description of a system that uses quadrature or vector recording is presented below.

If $a_k$ represents the channel bits (encoded data chosen from the set {±1}) on one track and the channel bits on an adjacent track then, considering both tracks simultaneously, the sequence $c_k = a_k + b_k$ can be represented by the set {−2,0, +2} and viewed as an amplitude modulation of the vertical field from the media. Likewise, the sequence $d_k = a_k - b_k$ also represented by the set {−2,0, +2} can be viewed as an amplitude modulation of the magnetic field in the cross-track direction (which is an in-plane and longitudinal direction based on the conventions used herein). A perpendicular reader straddling both tracks will primarily sense the modulated sequence $c_k$. If the head also contains a longitudinal reader straddling both tracks which primarily senses the in-plane, cross-track field (or the difference in the vertical field from each track) then this additional reader will primarily sense the sequence $d_k$. The original binary data sequences can be obtained by linear combinations of the ternary sequences $c_k$ and $d_k$, as shown below in Equations (1) and (2).

$$a_k = (c_k + d_k)/2 \quad (1)$$

$$b_k = (c_k - d_k)/2 \quad (2)$$

If either ternary sequence is detected individually, the performance will not meet that of the binary partial response signaling currently used in perpendicular recording. If however, both ternary sequences are detected jointly (e.g., find the sequences c and d that maximize the likelihood of receiving both the original primarily vertical readback signal and the primarily cross-track in plane readback signal) then there should be enough information present to provide greater capacity than the perpendicular channel alone. For example, a run of +1's or −1's in one channel corresponds to a run of 0's in the other. A noisy run of 0's in either channel should correspond to a relatively quiet run of ±1's (full signal swing with no transitions) in the other channel.

By ignoring any gains from joint detection, assuming each sensor provides the same signal to noise ratio, and any penalties from cross-coupling of the two channels (there will naturally be some through the asymmetry of the readers) are minimal, the results from earlier multilevel/multi-track recording analyses can be used to estimate a lower bound on the gain this signaling will provide. In those analyses, simulations of capacity of the vertical ternary partial response signaling (PRS) for a track written at the same width as the traditional binary PRS showed an achievable user bit density of 0.96 of that of the binary PRS system. The single ternary PRS only provides 1.5 bits per symbol (e.g., one cannot distinguish [1 −1] from [−1, 1], for the two ternary PRS case one will be able to recover the full 2 bits per symbol and ignoring any additional gains using joint detection, a vector recording system should be able to reach at least 1.33 times the capacity of the individual ternary PRS or (0.96*1.33=1.27) a capacity gain of 27 percent.

In order to maximize throughput of a vector recording system, both the P and L readers may be read and decoded simultaneously, after adjusting for relative time displacement of the signals as described above. In FIGS. 14-20, read-channel designs are shown that can process reader signals that result from data being recorded in different magnetization directions. These designs focus on the read-channel architecture options up until the end of the detectors (referred to herein as "front-end"). Thereafter, the read-channel architecture including channel codes (referred to herein as the "back-end") is described.

Figure 14:
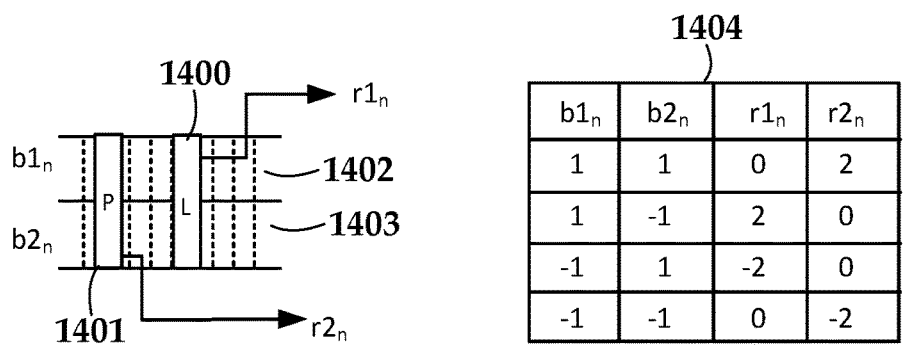
FIG. 14 is a block diagram showing of a reader and state table that are applicable to read channel designs according to example embodiments.

In FIG. 14, a block diagram shows a reader and state table that are applicable to the read channel designs shown in FIGS. 15-20. An "L" read transducer 1400 is configured to read longitudinal fields over two tracks 1402, 1403, producing the signal $r1_n$, which changes according to the values (perpendicular field orientations) of bits $b1_n$ and $b2_n$ read respectively from tracks 1402, 1403. A "P" read transducer 1401 is configured to read perpendicular fields over two tracks 1402, 1403, producing the signal $r2_n$, based on the value of bits $b1_n$ and $b2_n$. The table 1404 shows the value of signals $r1_n$ and $r2_n$ for the different values of bits $b1_n$ and $b2_n$. Generally, the read transducers 1400, 1401 may be mounted on the same head (or head-gimbal assembly) at a known downtrack offset, resulting in a small time offset between signals $r1_n$ and $r2_n$. However, in some embodiments, the read transducers 1400, 1401 may be mounted to different heads, head-gimbal assemblies, arms, etc., resulting in a much larger time offset between signals $r1_n$ and $r2_n$, which may involve larger buffers and latency in decoding, but may still utilize the general principles used to decode data from transducer co-located on the same head.

Figure 15:
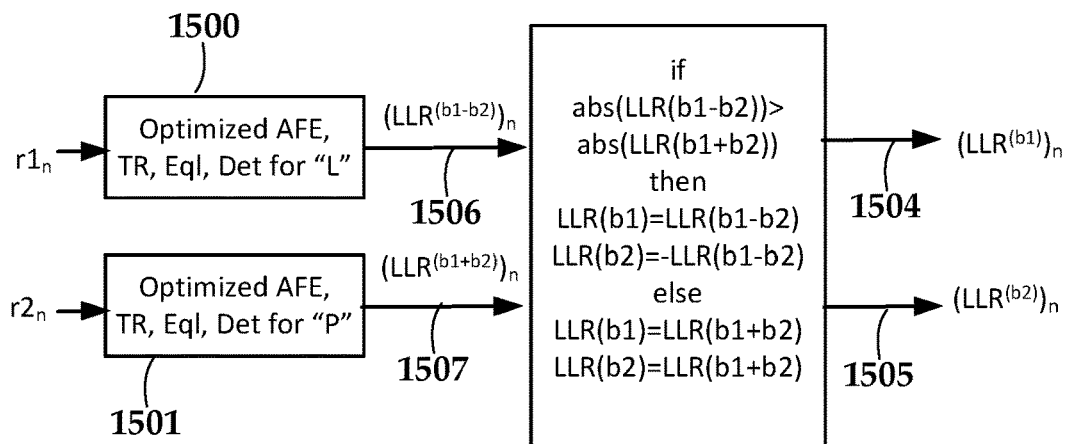
FIGS. 15-17 are block diagrams of read channel front ends according to example embodiments.

In FIG. 15, a diagram illustrates a read channel front-end according to an example embodiment. The front end has two independent 1-dimensional (1-D) front-end architectures, also generally referred to as detecting sections. The detecting sections include an analog front end (AFE), timing recovery (TR), equalization, and detection of the reader signals $r1_n$ and $r2_n$. One detecting section 1401 is optimized for reader "P" 1401 and the other section 1500 optimized for reader "L" 1400. The front-end sections 1500, 1501 output log-likelihood ratio (LLR) values 1506, 1507 for b1−b2 and b1+b2 at a given time instant "n". Then, a decision block 1502 follows with a comparison, which involves testing for the highest absolute value of the LLR values 1506, 1507 and using that as the basis for determining values of the individual bits. The outputs of the decision block 1502 are the LLR values 1504, 1505 for b1 and b2 at time "n".

The embodiment shown in FIG. 15 first processes the waveforms captured by readers "P" and "L" 1401, 1400, and extracts the LLR values for b1+b2 and b1−b2. Then, by looking at those LLR values, assigns the LLR values for b1 and b2. Another way to extract LLR values of b1 and b2 would be; first combine r1 and r2 to form the waveforms directly corresponding to b1 and b2, and then process those, which is shown the diagram of FIG. 16. Unlike the configuration in FIG. 15, the configuration in FIG. 16 combines all the signals to be used to detect the bits of interest at summation blocks 1600, 1601. Then, separate 1-D channels 1602, 1603 process the combined signals to detect the LLR 1604, 1605 of the respective bits.

Figure 16:
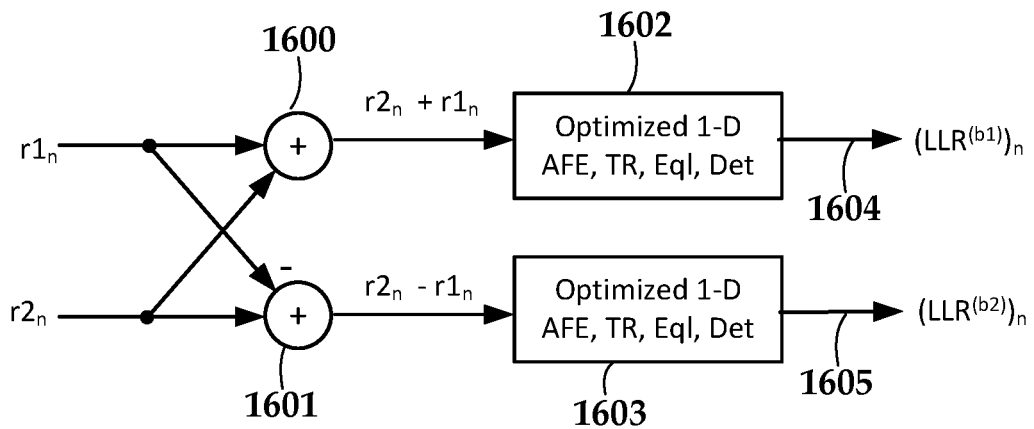
Figure 17:
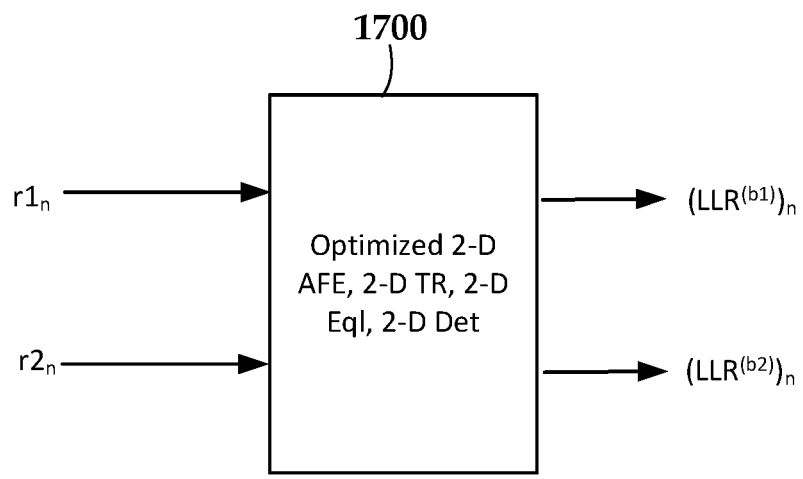

In the example architectures shown in FIGS. 15 and 16, independent 1-D channel architectures are used to detect the LLR of the bits b1 and b2. On the other hand, the system can be visualized as having two inputs (r1 and r2), which are correlated to each other, to be used to detect b1 and b2. In other words, although the system is a 2-D system with two inputs and two outputs, the architectures in FIGS. 15 and 16 approximate it with two 1-D systems. In FIG. 17, a block diagram shows an architecture with a 2-D optimum functional block 1700 (analog-front-end, timing recovery, equalizer, and detector) which takes r1 and r2 as inputs and outputs LLR values for b1 and b2.

Figure 18:
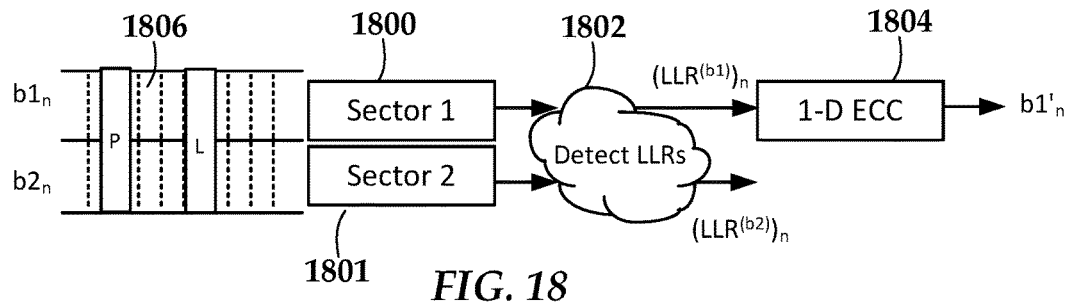
FIGS. 18-20 are block diagrams of read channel error correcting sections according to example embodiments.
Figure 19:
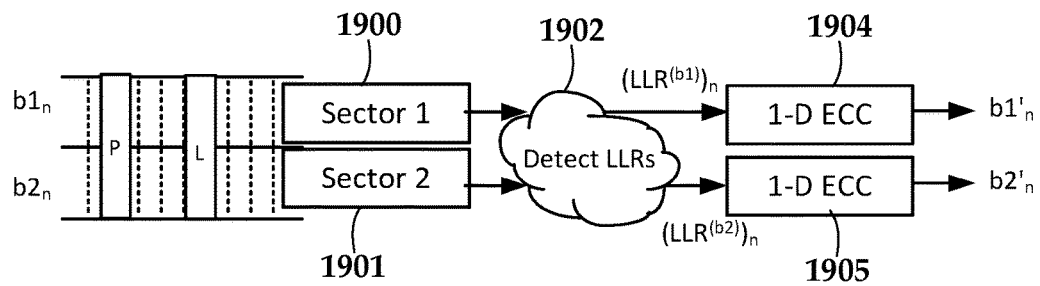
Figure 20:
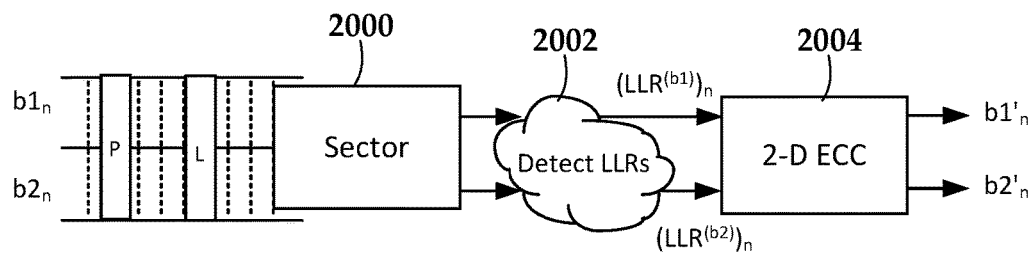

Once the LLR values corresponding to b1 and b2 at any given time "n" are extracted, there are different options to utilize them at the back end with different channel code constructions. Three options are shown in FIGS. 18-20. In FIG. 18, two sectors 1800, 1801 of different tracks are read via separate P and L readers, and a detector 1802 determines LLR for both tracks. Only the LLR values of the track of interest 1806 are used, and a 1-D error-correction code (ECC) section 1804 recovers the user data written on the single track 1806. This example obtains SNR gain in the detection process, although not as much as if 2-D codes were used. This example does not impose additional constraints to the write and read processes, hence the drive operation can be seamless in different drive configurations (e.g., conventional, shingled, interlaced). This architecture focuses on a single track, and therefore does not yield performance gains due to parallelism.

In FIG. 19, a diagram shows two sectors 1900, 1901 of different tracks that are read via separate P and L readers, and a detector 1902 determines LLR for both tracks. This example uses the LLR values of the bits on both tracks, and utilizes two independent conventional 1-D ECC sections 1904, 1905 to recover the user data written on the adjacent tracks. As with the previous example, this configuration can use conventional ECC architectures, thus does not need any additional ECC complexity. This obtains SNR gain, hence AD improvement, in the detection process. This example does not utilize 2-D ECC codes to further improve system SNR, hence does not maximize AD improvement. This configuration can yield performance gains in sequential read performance or long random read performance where the sectors written at adjacent tracks are to be read together. In order to get a performance gain, the write process will match the locations (e.g., crosstrack bit alignment) of the sectors 1900, 1901 which are to be read together. Other than the localization constraint during the write process, the configuration in FIG. 19 does not impose any other constraints on write and read. Thus, can be used with controllers designed for shingled recording, for example. Also, conventional ECC architectures can be used for both the tracks.

In FIG. 20, a diagram shows a single sector 2000 that is read jointly via separate P and L readers. Generally, this sector 2000 is formed by dividing it into two parts, and writing each part of the sector 2000 on adjacent tracks. This is in contrast to the previous embodiments, in which sectors 1800, 1801, 1900, 1901 may be independently encoded and written. The embodiment shown in FIG. 20 may use a custom write architecture to encode the sector into multiple parts and write the multiple parts on adjacent tracks. A detector 2002 determines LLR for both tracks, and a 2-D ECC section 2004 recovers the user data written on the adjacent tracks.

Because information written at adjacent tracks is always relevant, the configuration shown in FIG. 20 yields sequential and random read performance gains for any workload that is not significantly impacted by seek and settle time. Thus it may be particularly suited to some applications such as video recording and cold storage. This configuration achieves a SNR gain both in detection process and ECC, thus yielding the most AD improvement of the three back-end options shown in FIGS. 18-20.

Figure 21:
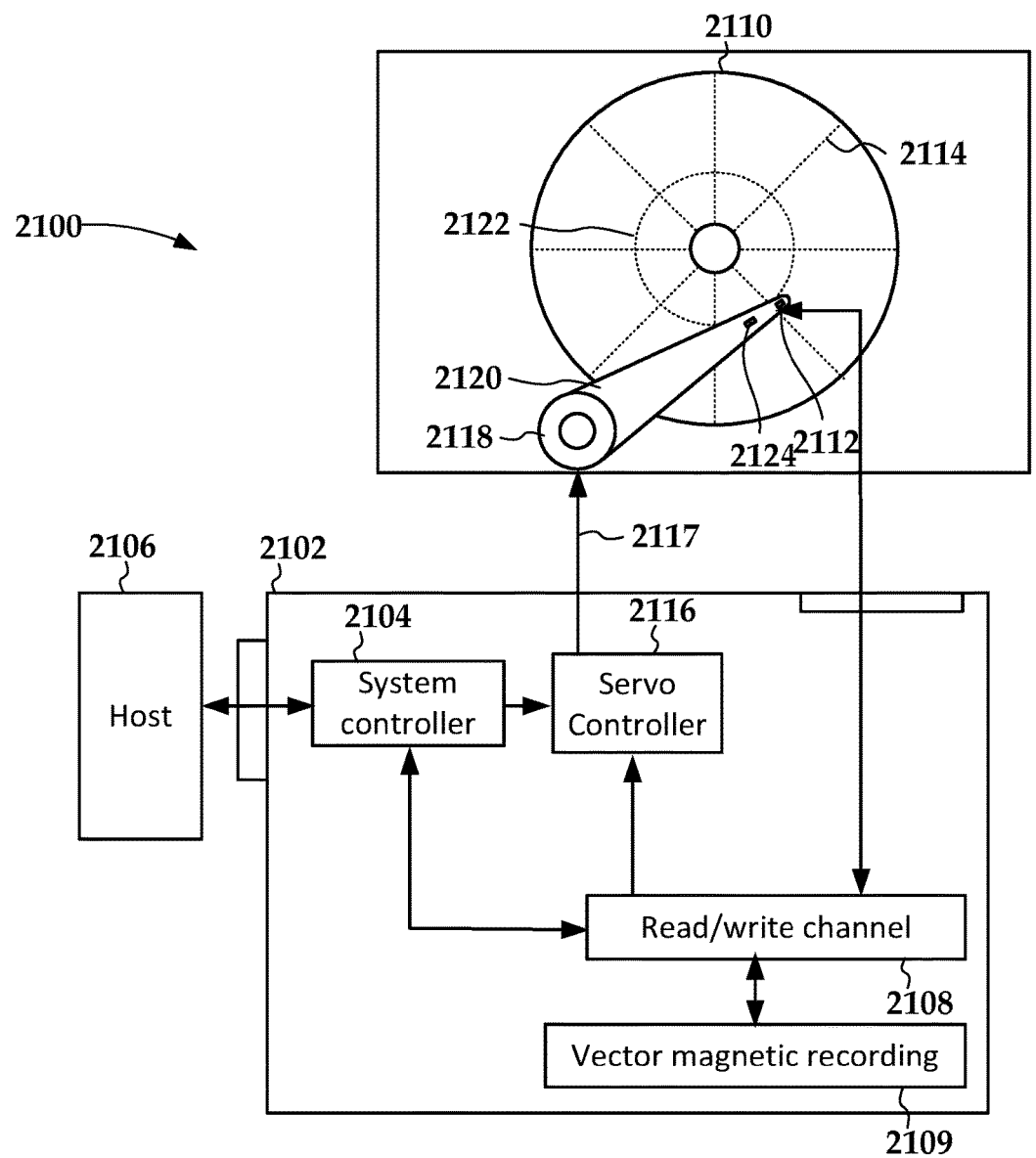
FIG. 21 is a block diagram of an apparatus according to an example embodiment.

In FIG. 21, a diagram illustrates components of a storage drive apparatus 2100 that utilizes one or more read/write heads 2112 according to example embodiments. The read/write head 2112 is mounted to a head-gimbal assembly and at least one of the heads 2112 is configured with first and second read transducers. The first reader provides a first signal based on detecting a total perpendicular field of a first and second track of the disk 2110. The second reader provides a second signal based on detecting a total longitudinal field of the first and second tracks.

The apparatus includes circuitry 2102 such as a system controller 2104 that processes read and write commands and associated data from a host device 2106. The host device 2106 may include any electronic device that can be communicatively coupled to store and retrieve data from a data storage device, e.g., a computer. The system controller 2104 is coupled to a read/write channel 2108 that reads from and writes to surfaces of one or more magnetic disks 2110. The read/write channel 2108 generally converts data between the analog signals used by the heads 2112 to the digital data used by the system controller 2104 for host communications.

The read/write channel 2108 may include analog and digital circuitry such as detectors, timing-correction units, equalizers, error correction units, preamplifiers, filters, digital-to-analog converters, analog-to-digital converters, etc. The read/write channel 2108 may have particular features that facilitate reading the first and second signals. For example, the read/write channel may have analog front ends, equalizers, and detectors that are specially tuned for the particular perpendicular and longitudinal fields of the first and second readers as well as the characteristic signals produced by these fields in particular recording patterns. The read/write channel may utilize servo data (described below) to detect head position and use this to estimate the effects of skew on downtrack separation of the readers. The write sections of the write channel may also have features that ensure corresponding bits in adjacent tracks are aligned within each data sector. The write channel may also jointly encode aligned bits within data sectors before the bits are written to the individual tracks/subtracks. Some of these features may be included in firmware instructions, as indicated by vector magnetic recording module 2109.

In addition to processing user data, the read/write channel 2108 reads servo data from servo wedges 2114 on the magnetic disk 2110 via the read/write head. All of the multiple readers of the read/write head may be used to read servo data, or only a subset thereof. The servo data are sent to a servo controller 2116, which uses the data to provide position control signals 2117 to an actuator such as a voice coil motor (VCM) 2118. The VCM 2118 rotates an arm 2120 upon which the read/write heads 2112 are mounted in response to the control signals 2117. The position control signals 2117 may also be sent to microactuators 2124 that individually control each of the read/write heads 2112, e.g., causing small displacements at each head. The apparatus 2100 may include multiple arms and VCMs (not shown), such that a surface of the disk 2110 can be accessed by multiple heads driven by different VCMs.

Figure 22:
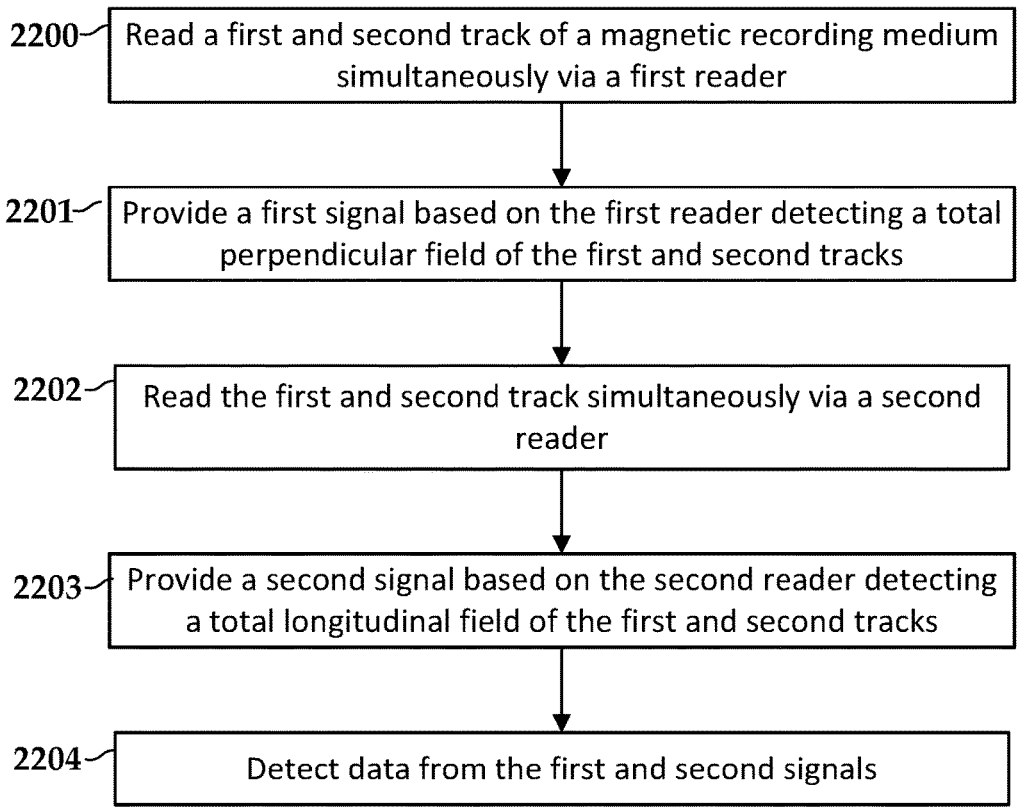
FIG. 22 is a flowchart of a method according to an example embodiment.

In reference now to FIG. 22, a flowchart illustrates a method according to an example embodiment. The method involves reading 2200 a first and second track of a magnetic recording medium simultaneously via a first reader that spans the first and second tracks. The reader provides 2201 a first signal based on detecting a total perpendicular field of the first and second tracks. The first and second tracks are read 2202 simultaneously via a second reader that also spans the first and second tracks. The second reader provides 2203 a second signal based on detecting a total longitudinal field of the first and second tracks.

Data that is jointly encoded in the first and second signals is detected 2204. For example, two or more independent, one-dimensional front-end sections may receive different combinations of the two or more signals and output LLR values of first and second aligned bits of the first and second tracks. The combinations of the first and second signals may include the individual signals themselves as shown in FIG. 15, or sums and differences of the signals as shown in FIG. 16. In other embodiments, a single, two-dimensional front-end section may be used as shown in FIG. 17. Detecting 2204 may also involve one or more one-dimensional error correcting code sections or the use of a two-dimensional error correcting code section.

Note that the first and second readers are generally configured to provide 2201, 2203 the first and second signals simultaneously as both readers may be held over the first and second tracks contemporaneously. Because the readers may have a fixed or known downtrack offset from each other, the detecting may also involve buffering or otherwise time-delaying processing on one of the signals so that portions of the signals corresponding to aligned bits can be processed together.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description, and is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   reading a first and second track of a magnetic recording medium simultaneously via a first reader that provides a first signal based on detecting a total perpendicular field of the first and second tracks;
   reading the first and second tracks simultaneously via a second reader, the second reader providing a second signal based on detecting a total longitudinal field of the first and second tracks; and
   detecting data from the first and second signals.

2. The method of claim 1, wherein the first and second readers are mounted to a same head-gimbal assembly such that the first and second signals are offset by a time period for each aligned bit of the first and second tracks.

3. The method of claim 1, wherein detecting the data comprises reading the first and second signals via first and second independent, one-dimensional, front-end sections optimized for the first and second readers respectively, the outputs of the first and second front-end sections being used to, for each aligned first and second bit read from the first and second tracks, determine first and second log likelihood ratios respectively associated with a sum of the first and second bits and a difference between the first and second bits.

4. The method of claim 1, wherein detecting the data comprises sending a sum of the first and second signals to a first, one-dimensional, front-end section and a difference between the first and second signals to a second, one-dimensional, front-end section independent from the first front-end section, the outputs of the first and second front-end sections comprising log likelihood ratios of first and second aligned bits of the first and second tracks, respectively.

5. The method of claim 1, wherein detecting the data comprises sending the first and second signals to two-dimensional front-end section, the outputs of the single, two-dimensional front-end section comprising log likelihood ratios of first and second aligned bits of the first and second tracks, respectively.

6. The method of claim 1, wherein detecting the data comprises determining log likelihood ratios of first and second aligned bits of the first and second tracks, respectively, the method further comprising performing error correction on the first and second bits via independent, one-dimensional error-correction code sections.

7. The method of claim 1, wherein detecting the data comprises determining log likelihood ratios of first and second aligned bits of the first and second tracks, respectively, the method further comprising performing error correction on the first and second bits via a single two-dimensional error-correction code section.

8. The method of claim 7, further comprising writing a combined sector to the first and second tracks, the first and second aligned bits both being part of the combined sector.

9. The method of claim 1, wherein bit boundaries of the first and second tracks are aligned within a sector of the first and second tracks.

10. An apparatus comprising:
   interface circuitry coupled to first and second readers that simultaneously provide first and second signals while spanning first and second tracks of a magnetic recording medium, the first reader providing the first signal based on detecting a total perpendicular field of the first and second tracks, the second reader providing the second signal based on detecting a total longitudinal field of the first and second tracks; and
   a read channel coupled to the interface circuitry and configured to detect data from the first and second signals.

11. The apparatus of claim 10, wherein the first and second readers are mounted to a same read head.

12. The apparatus of claim 10, wherein the read channel comprises first and second independent, one-dimensional, front-end sections optimized for the first and second readers respectively, the outputs of the first and second front-end sections being used to, for each aligned first and second bit read from the first and second tracks, determine first and second log likelihood ratios respectively associated with a sum of the first and second bits and a difference between the first and second bits.

13. The apparatus of claim 10, wherein detecting the data comprises sending a sum of the first and second signals to a first, one-dimensional, front-end section and sending a difference between the first and second signals to a second, one-dimensional, front-end section independent from the first front-end section, the outputs of the first and second front-end sections comprising log likelihood ratios of first and second aligned bits of the first and second tracks, respectively.

14. The apparatus of claim 10, wherein the read channel comprises a two-dimensional front-end section that receives the first and second signals, the outputs of the single, two-dimensional front-end section comprising log likelihood ratios of first and second aligned bits of the first and second tracks, respectively.

15. The apparatus of claim 10, wherein detecting the data comprises determining log likelihood ratios of first and second aligned bits of the first and second tracks, respectively, the read channel further comprising two or more independent, one-dimensional error-correction code sections performing error correction on the first and second bits.

16. The apparatus of claim 10, wherein detecting the data comprises determining log likelihood ratios of first and second aligned bits of the first and second tracks, respectively, the read channel further comprising a single two-dimensional error-correction code section performing error correction on the first and second bits.

17. The apparatus of claim 16, further comprising a write channel that writes a combined sector to the first and second tracks, the first and second aligned bits both being part of the combined sector.

18. A system, comprising:
   a head-gimbal assembly comprising a first reader and a second reader offset in a downtrack direction, the first reader reading providing a first signal based on detecting a total perpendicular field of a first and second track of a magnetic recording medium, the second reader providing a second signal based on detecting a total longitudinal field of the first and second tracks; and
   a read channel operable to detect data from the first and second signals.

19. The system of claim 18, wherein the read channel comprises first and second one-dimensional, front-end sections that independently receive different combinations of the first and second signals.

20. The system of claim 18, wherein the read channel comprises a two-dimensional front-end section that receives both the first and second signals.

* * * * *